United States Patent
Otto et al.

(10) Patent No.: US 9,117,224 B2
(45) Date of Patent: Aug. 25, 2015

(54) SELF LEARNING METHOD AND SYSTEM TO PROVIDE AN ALTERNATE OR ANCILLARY PRODUCT CHOICE IN RESPONSE TO A PRODUCT SELECTION

(75) Inventors: Jonathan Otto, Palm Beach, FL (US); Andrew Van Luchene, Santa Fe, NM (US)

(73) Assignee: RetailDNA, LLC, Garden City Park, NY (US)

( * ) Notice: Subject to any disclaimer, the term of this patent is extended or adjusted under 35 U.S.C. 154(b) by 843 days.

(21) Appl. No.: 12/618,232

(22) Filed: Nov. 13, 2009

(65) Prior Publication Data

US 2010/0057661 A1    Mar. 4, 2010

Related U.S. Application Data

(63) Continuation-in-part of application No. 12/151,042, filed on May 2, 2008, now abandoned, which is a continuation-in-part of application No. 11/983,679, filed on Nov. 9, 2007, now abandoned, which is a continuation-in-part of application No. 09/993,228, filed on Nov. 14, 2001, now abandoned, application No. 12/618,232, which is a continuation-in-part of application No. 12/151,043, filed on May 2, 2008, now abandoned, which is a continuation-in-part of application No. 11/983,679, filed on Nov. 9, 2007, now abandoned, which is a continuation-in-part of application No. 09/993,228, filed on Nov. 14, 2001, now abandoned.

(51) Int. Cl.
*G06Q 30/02* (2012.01)
*G06Q 30/06* (2012.01)

(52) U.S. Cl.
CPC ........ *G06Q 30/0224* (2013.01); *G06Q 30/0238* (2013.01); *G06Q 30/06* (2013.01)

(58) Field of Classification Search
None
See application file for complete search history.

(56) References Cited

U.S. PATENT DOCUMENTS

| | | | | |
|---|---|---|---|---|
| 6,055,513 | A * | 4/2000 | Katz et al. | 705/26.41 |
| 6,412,012 | B1 * | 6/2002 | Bieganski et al. | 709/232 |
| 6,452,498 | B2 * | 9/2002 | Stewart | 340/573.1 |
| 6,741,969 | B1 * | 5/2004 | Chen et al. | 705/14.27 |
| 6,993,326 | B2 * | 1/2006 | Link et al. | 455/414.1 |
| 2002/0055906 | A1 * | 5/2002 | Katz et al. | 705/39 |

* cited by examiner

*Primary Examiner* — Stanley K Hill
(74) *Attorney, Agent, or Firm* — Michael D. Downs; Fincham Downs, LLC

(57) ABSTRACT

A system including: a memory element for storing an artificial intelligence program (AIP); an interface element for receiving, from a wireless communications device (WCD), a first portion of an order; and a processor for generating, using the AIP, an offer in response to items or services in the first portion of the order. The interface element is for transmitting the offer to the WCD and receiving, from the WCD, a second portion of the order. The processor is for modifying, using the AIP, the offer in response to items or services in the first and second portions of the order by adding or modifying items, services, or incentives. The interface element is for transmitting the modified offer to the wireless communications network for transmission to the WCD.

12 Claims, 1 Drawing Sheet

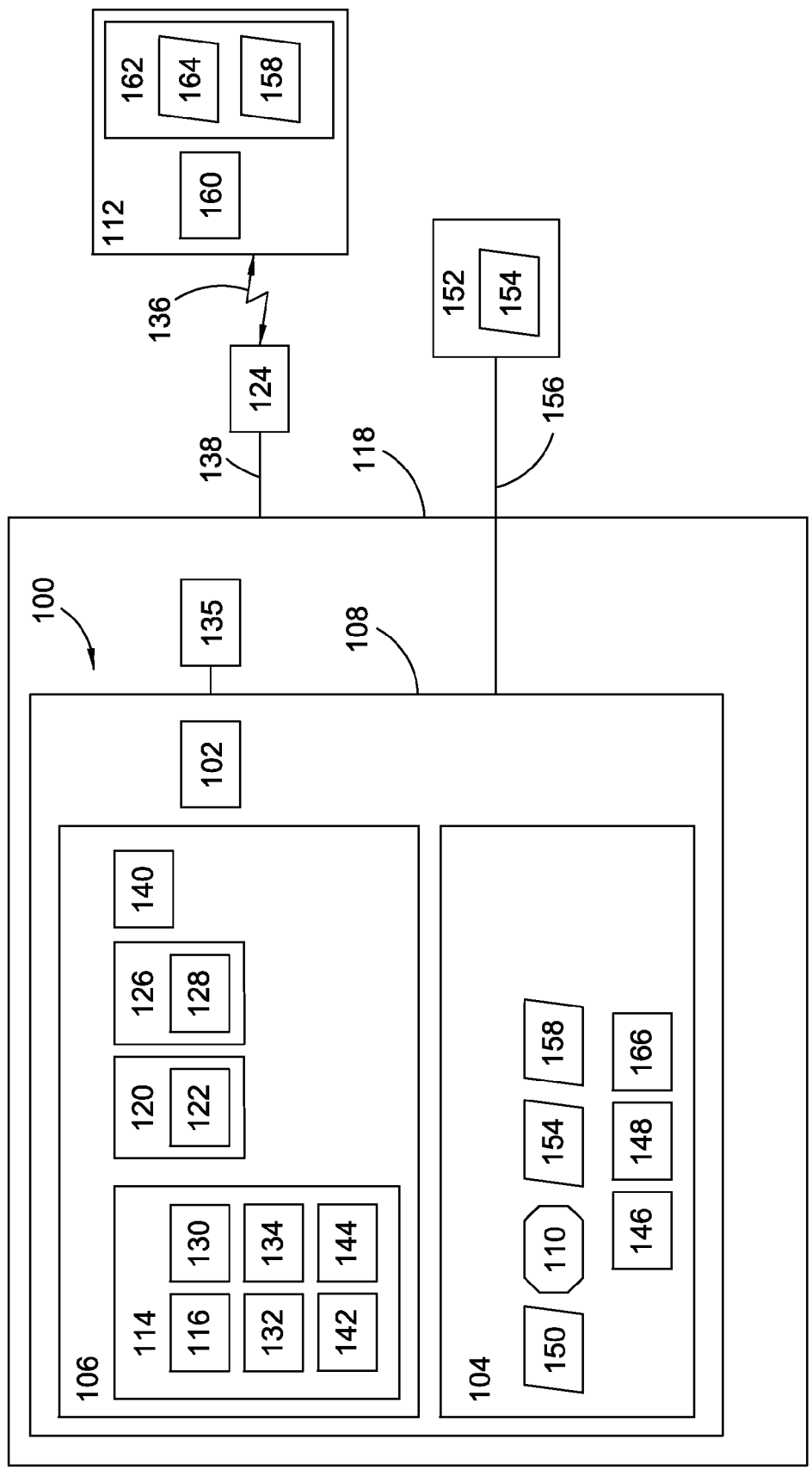

SELF LEARNING METHOD AND SYSTEM TO PROVIDE AN ALTERNATE OR ANCILLARY PRODUCT CHOICE IN RESPONSE TO A PRODUCT SELECTION

CROSS-REFERENCE TO RELATED APPLICATIONS

This is a continuation-in-part patent application under 35 USC 120 of commonly-owned U.S. patent application Ser. No. 12/151,042, entitled "Method and System For Generating an Offer and Transmitting the Offer to a Wireless Communications Device," filed May 2, 2008; and U.S. patent application Ser. No. 12/151,043, filed May 2, 2008 and entitled "Method and System For Centralized Generation of a Business Executable Using Genetic Algorithms and Rules Distributed Among Multiple Hardware Devices," both of which are continuations-in-part of U.S. patent application Ser. No. 11/983,679, filed Nov. 9, 2007 and entitled "Method and System for Generating, Selecting, and Running Executables in a Business System Utilizing a Combination of User Defined Rules and Artificial Intelligence" which is a continuation-in-part patent application under 35 USC 120 of U.S. patent application Ser. No. 09/993,228, filed Nov. 14, 2001 and entitled "Method and apparatus for dynamic rule and/or offer generation," which applications are incorporated herein by reference.

This application is related to: U.S. patent application Ser. No. 09/052,093 entitled "Vending Machine Evaluation Network" and filed Mar. 31, 1998; U.S. patent application Ser. No. 09/083,483 entitled "Method and Apparatus for Selling an Aging Food Product" and filed May 22, 1998; U.S. patent application Ser. No. 09/282,747 entitled "Method and Apparatus for Providing Cross-Benefits Based on a Customer Activity" and filed Mar. 31, 1999; U.S. patent application Ser. No. 08/943,483 entitled "System and Method for Facilitating Acceptance of Conditional Purchase Offers (CPOs)" and filed on Oct. 3, 1997, which is a continuation-in-part of U.S. patent application Ser. No. 08/923,683 entitled "Conditional Purchase Offer (CPO) Management System For Packages" and filed Sep. 4, 1997, which is a continuation-in-part of U.S. patent application Ser. No. 08/889,319 entitled "Conditional Purchase Offer Management System" and filed Jul. 8, 1997, which is a continuation-in-part of U.S. patent application Ser. No. 08/707,660 entitled "Method and Apparatus for a Cryptographically Assisted Commercial Network System Designed to Facilitate Buyer-Driven Conditional Purchase Offers," filed on Sep. 4, 1996 and issued as U.S. Pat. No. 5,794,207 on Aug. 11, 1998; U.S. patent application Ser. No. 08/920,116 entitled "Method and System for Processing Supplementary Product Sales at a Point-Of-Sale Terminal" and filed Aug. 26, 1997, which is a continuation-in-part of U.S. patent application Ser. No. 08/822,709 entitled "System and Method for Performing Lottery Ticket Transactions Utilizing Point-Of-Sale Terminals" and filed Mar. 21, 1997; U.S. patent application Ser. No. 09/135,179 entitled "Method and Apparatus for Determining Whether a Verbal Message Was Spoken During a Transaction at a Point-Of-Sale Terminal" and filed Aug. 17, 1998; U.S. patent application Ser. No. 09/538,751 entitled "Dynamic Propagation of Promotional Information in a Network of Point-of-Sale Terminals" and filed Mar. 30, 2000; U.S. patent application Ser. No. 09/442,754 entitled "Method and System for Processing Supplementary Product Sales at a Point-of-Sale Terminal" and filed Nov. 12, 1999; U.S. patent application Ser. No. 09/045,386 entitled "Method and Apparatus For Controlling the Performance of a Supplementary Process at a Point-of-Sale Terminal" and filed Mar. 20, 1998; U.S. patent application Ser. No. 09/045,347 entitled "Method and Apparatus for Providing a Supplementary Product Sale at a Point-of-Sale Terminal" and filed Mar. 20, 1998; U.S. patent application Ser. No. 09/083,689 entitled "Method and System for Selling Supplementary Products at a Point-of Sale and filed May 21, 1998; U.S. patent application Ser. No. 09/045,518 entitled "Method and Apparatus for Processing a Supplementary Product Sale at a Point-of-Sale Terminal" and filed Mar. 20, 1998; U.S. patent application Ser. No. 09/076,409 entitled "Method and Apparatus for Generating a Coupon" and filed May 12, 1998; U.S. patent application Ser. No. 09/045,084 entitled "Method and Apparatus for Controlling Offers that are Provided at a Point-of-Sale Terminal" and filed Mar. 20, 1998; U.S. patent application Ser. No. 09/098,240 entitled "System and Method for Applying and Tracking a Conditional Value Coupon for a Retail Establishment" and filed Jun. 16, 1998; U.S. patent application Ser. No. 09/157,837 entitled "Method and Apparatus for Selling an Aging Food Product as a Substitute for an Ordered Product" and filed Sep. 21, 1998, which is a continuation of U.S. patent application Ser. No. 09/083,483 entitled "Method and Apparatus for Selling an Aging Food Product" and filed May 22, 1998; U.S. patent application Ser. No. 09/603,677 entitled "Method and Apparatus for selecting a Supplemental Product to offer for Sale During a Transaction" and filed Jun. 26, 2000; U.S. Pat. No. 6,119,100 entitled "Method and Apparatus for Managing the Sale of Aging Products and filed Oct. 6, 1997 and U.S. Provisional Patent Application Ser. No. 60/239,610 entitled "Methods and Apparatus for Performing Upsells" and filed Oct. 11, 2000.

By "related to" we mean that the present application and the applications noted above are in the same general technological area and have a common inventor or assignee. However, "related to" does not necessarily mean that the present application and any or all of the applications noted above are patentably indistinct, or that the filing date for the present application is within two months of any of the respective filing dates for the applications noted above.

FIELD OF THE INVENTION

The invention relates generally to a method and system to dynamically provide an alternate or ancillary product choice during a transaction in response to an order placed by a customer-controlled point of sale device as part of the transaction, using artificial intelligence.

BACKGROUND OF THE INVENTION

The prior art teaches various responses to a transaction process.

SUMMARY OF THE INVENTION

The invention broadly comprises a system for providing an alternate or ancillary product choice in response to an order placed by a customer-controlled point of sale device, including: a memory element for at least one specially programmed computer, for storing an artificial intelligence program (AIP); an interface element, for the at least one specially programmed computer, for receiving, from a first wireless communications device (WCD), a first portion of an order for a first item or service available from a first business entity, the order part of a transaction between a user of the first WCD and the first business entity; a processor for the at least one specially programmed computer, for generating, using the AIP, an offer in response to the first item or service, wherein the offer includes at least one second item or service available from the first business entity and wherein the at least one second item or service: is a substitute for the first item or service; includes a plurality of said second items or services in a package offer; or is a compliment to the first item or service. The interface element is for: transmitting the offer to a wireless communications network for transmission to the first WCD; and receiving, from the first WCD, a second portion of the order for a third item or service available from the first business entity, wherein the second portion of the order is part of the transaction. The processor is for modifying, using the AIP, the offer in response to the first item or service and the at least one third item or service. Modifying the offer includes adding a first incentive to the offer; modifying a second incentive included in the offer; adding at least one fourth item or service available from the first business entity; or deleting at least some of said at least one first, second or third item or service from the order or offer. The interface element is for transmitting the modified offer to the wireless communications network for transmission to the first WCD.

In one embodiment, the first WCD includes a memory element arranged to store at least one rule and the first WCD includes a processor for executing the modified offer according to the at least one rule. In another embodiment, the interface element is for receiving at least one rule from a second WCD, or from a general-purpose computer associated with a second business entity, the memory element is for storing the at least one rule, and the processor is for modifying the offer using the at least one rule.

In one embodiment, the interface element is for receiving a refusal of the modified offer from the first WCD, the processor is for further modifying the offer, using the AIP, in response to the refusal, further modifying the offer includes adding a third incentive to the offer; modifying the first or second incentive; adding at least one fifth item or service available from the first business entity; deleting at least some of said at least one first or third item or service from the order; or deleting at least some of said at least one second or fourth item or service from the modified offer, and the interface element is for transmitting the further modified offer to the wireless communications network for transmission to the first WCD. In another embodiment, the first WCD includes a memory element for storing at least one rule and the first WCD includes a processor for executing the further modified offer according to the at least one rule. In one embodiment, the interface element is for receiving at least one rule from a second WCD, or from a general-purpose computer associated with a second business entity, the memory element is for storing the at least one rule, and the processor is for further modifying the offer using the at least one rule.

The invention also broadly comprises a method for providing an alternate or ancillary product choice in response to an order placed by a customer-controlled point of sale device.

It is a general object of the present invention to provide a system and a method to dynamically and intelligently provide an alternate or ancillary product choice during a transaction in response to an order placed by a customer-controlled point of sale device as part of the transaction.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing Figures, in which:

FIG. 1 is a schematic block diagram of a present invention system for providing an alternate or ancillary product choice in response to an order placed by a customer-controlled point of sale device.

DETAILED DESCRIPTION OF THE PREFERRED EMBODIMENT

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein shall include the same meaning as commonly understood to one of ordinary skill in the art to which this invention belongs. Although any methods, devices or materials similar or equivalent to those described herein can be used in the practice or testing of the invention, the preferred methods, devices, and materials are now described.

It should be understood that the use of "or" in the present application is with respect to a "non-exclusive" arrangement, unless stated otherwise. For example, when saying that "item x is A or B," it is understood that this can mean one of the following: 1) item x is only one or the other of A and B; and 2) item x is both A and B. Alternately stated, the word "or" is not used to define an "exclusive or" arrangement. For example, an "exclusive or" arrangement for the statement "item x is A or B" would require that x can be only one of A and B.

FIG. 1 is a schematic block diagram of present invention system 100 for providing an alternate or ancillary product choice in response to an order placed by a customer-controlled point of sale device (POSD). System 100 includes interface element 102, memory element 104, and processor 106 for at least one specially programmed computer, for example, computer 108. The memory element is for storing artificial intelligence program (AIP) 110. The interface element is for receiving and order, from a customer-controlled POSD. In one embodiment, the POSD is wireless communications device 112. In one embodiment, the order includes order portion 114 for item or service 116 available from a business entity, for example, a business entity associated with location 118. Order portion 114 is part of a transaction between a user of WCD 112 and the business entity. The processor is for generating, using the AIP, offer 120 in response to item or service 116. The offer includes at least one item or service 122 available from the business entity. In one embodiment, item or service 122 is a substitute for item or service 116; includes a plurality of item or service 122 in a package offer; or is a compliment to item or service 116.

By interface element, we mean any combination of hardware, firmware, or software in a computer used to enable communication or data transfer between the computer and a device, system, or network external to the computer. The interface element can connect with the device, system, or network external to the computer using any means known in the art, including, but not limited to a hardwire connection, an optical connection, an Internet connection, or a radio frequency connection. Processor 106 and interface element 102 can be any processor or interface element, respectively, or combination thereof, known in the art.

Computer 108 can be any computer or plurality of computers known in the art. In one embodiment, the computer is located in a retail location with which system 100 is associated, for example, location 118. In another embodiment (not shown), all or parts of the computer are remote from retail locations with which system 100 is associated. In a further embodiment, computer 108 is associated with a plurality of retail locations with which system 100 is associated. Thus, the computer provides the functionality described for more than one retail location.

The interface element is for transmitting offer 120 to wireless communications network 124 for transmission to WCD 112; and receiving, from WCD 112, order portion 126 for third item or service 128 available from the business entity, as part of the original transaction described supra. It should be understood that order portions 114 and 126 are part of an on-going order process. The processor is for modifying, using the AIP, offer 120 in response to the items or services ordered thus far as part of the transaction, for example, items or services 116 or 128. In one embodiment, modifying the offer includes adding incentive 130 to the offer; modifying incentive 132 already included in the offer; adding at least one item or service 134 available from the business entity; or deleting at least some of items or services 116, 122, or 128 from the order or offer. The interface element is for transmitting the modified offer to the wireless communications network for transmission to WCD 112.

The POSD can be any POSD known in the art, for example, self-service kiosk 135. WCD 112 can be any WCD known in the art. Commonly-owned and co-pending U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008 is applicable to interaction of the WCD and system 100.

In one embodiment, a WCD usable with system 100, for example, WCD 112, is owned by, leased by, or otherwise already in possession of an end user when system 100 interfaces with the WCD. In the description that follows, it is assumed that the WCD is owned by, leased by, or otherwise already in possession of the end user when system 100 interfaces with the WCD. In general, the WCD communicates with a network, for example, network 124, via radio-frequency connection 136. Network 124 can be any network known in the art. In one embodiment, the network is located outside of the retail location, for example, the network is a commercial cellular telephone network. In one embodiment (not shown), the network is located in a retail location, for example, the network is a local network, such as a Bluetooth network. The interface element can connect with network 124 using any means known in the art, including, but not limited to a hardwire connection, an optical connection, an Internet connection, or a radio frequency connection. In the figures, a non-limiting example of a hardwire connection 138 is shown. In one embodiment, WCD 112 is connectable to a docking station (not shown) to further enable communication between WCD 112 and system 100. Any docking station or docking means known in the art can be used. That is, when WCD 112 is connected to the docking station, a link is established between the device and system 100.

In one embodiment, the interface element is for receiving refusal 140 of the modified offer from WCD 112, and the processor is for further modifying the offer, using the AIP, in response to the refusal. In one embodiment, further modifying the offer includes adding incentive 142 to the offer; modifying incentives 130 or 132; adding item or service 144 available from the business entity; deleting at least some of items or services 116 or 128 from the order; or deleting at least some of items or services 122 or 134 from the modified offer. The interface element transmits the further modified offer to the wireless communications network for transmission to the WCD.

Thus, a POSD, for example, an end user device, such as a WCD, for example, a cell phone or PDA, is used as an order taking device for a transaction in a retail establishment. As items are added to the transaction, a present invention system dynamically generates offers, for example, offer 120, for additional or substitute products based on the items entered. If an end user accepts an offer, the system alters the transaction based on what offer is accepted. In one embodiment, a genetic algorithm, such as the AIP, adjusts offers that are made based on the historical success of such offers.

In one embodiment, offer 120 includes an alternate item or service that is a substitute for an item or service that has been entered into the transaction, for example, in order portion 114. A substitute item or service can be selected by the system, for example, by the processor using the AIP, based on, but not limited to, the following factors:
1. the substitute item or service is more profitable to the business entity than the item or service in the original order;
2. a manufacturer or provider of an item or service will pay a certain amount to the business entity for making such offers and will pay an additional amount when such offers are accepted; or
3. the retailer has more of the substitute item in stock than the item in the original order.

In one embodiment, offer 120 includes an item or service that compliments the product that is entered into the transaction, for example, in order portion 114. A complimentary item or service can be selected by the system, for example, by the processor using the AIP, based on, but not limited to, the following factors:
1. the complimentary item or service has been historically purchased in conjunction with items or services in the original order;
2. the business entity has a certain inventory of a product that is considered a compliment to an item in the original order; or
3. a manufacturer is willing to pay to offer an item as a compliment to another item in the original order.

In one embodiment, offer 120 includes a package of items or services. A package of items or services can be selected by the system, for example, by the processor using the AIP, based on, but not limited to, the following factors:
1. one or more items or services in the package are included in the transaction, for example, in order portion 114;
2. a retailer has a certain inventory count of a particular group of items that are deemed appropriate for a package
3. one or more manufacturers are willing to pay to have their respective products offered as part of a package.

Variables in offer 120 include, but are not limited to: items or services being offered; an incentive including a discount or free item or service; number and type of items or services in a package; and price. Other factors considered and used by the processor along with the AIP include, but are not limited to:
1. the items or services in the original order;
2. transaction history of the customer, for example, the items previously purchased by the customer;

3. customer information, such as identity and demographic data;
4. the business entity involved in the transaction;
5. the inventory or labor availability of the business entity;
6. manufacturer subsidy of offers;
7. business entity subsidy of offers;
8. the number of items in the transaction;
9. the number of complimentary items in the transaction;
10. the number of groups or packages in the transaction;
11. whether a particular offer or offer type has been accepted before;
12. items scanned vs. items bought;
13. availability of an item or service;
14. manufacturer discount;
15. business entity discount;
16. sales velocity or volume associated with the business entity;
17. profitability of items or services in the transaction or of items or services available for substitution, complementary, or group offers;
18. overall profitability of the business entity;
19. profitability of the business entity at the time of the transaction;
20. product turnover; and
21. product cost.

In one embodiment, in addition to generating and transmitting an offer to add or substitute items or services, the system can also provide directions to where the items can be picked up, for example, in a store.

A genetic algorithm, for example, the AIP, can determine:
1. the best incentive to motivate acceptance of an offer, for example, offer 120;
2. the best package price to motivate acceptance of an offer, for example, offer 120, in response to orders, for example, to one or a group of items or services in an order;
3. the number of offers to be made and displayed and how the offers are displayed; and
4. the order of importance or sequence of offer types, for example, first offer a substitute, if not accepted, offer a package, if not accepted, offer a compliment.

In one embodiment, an application enabling any or all of the functionality and operations described supra is made available on end user devices, for example, WCDs, so that the devices can process a transaction in a retail environment. The following is an example sequence possible with the device:
  Receive End User Log-in, for example, to initiate interface with business entity.
  Output POS graphical user interface (GUI) to the end user device, for example, output data and instructions for enabling the device to interface with a business entity and execute functions described supra.
  Receive item or service in an order from the device.
  Determine if offer is available for the item or service.
  Output Offer, for example, as described supra.
  Receive offer acceptance from device.
  Modify transaction based on offer acceptance.
  Output additional information, for example, direction to the business entity location, or a specific location within a facility for the business entity, based on offer acceptance.

In one embodiment, an Offer Program, for example, stored in a memory element for a computer executing operations discussed supra, includes the following functionality:
  Receive an item request.
  Determine if an offer is available for the item.
  Output package offer.
  Receive acceptance of offer.
  Alter transaction based on offer acceptance.
  Output item data based on offer rules.

In one embodiment, a Rules Program, for example, stored in a memory element for a computer executing operations discussed supra, includes the following functionality:
  Retrieve Transaction information.
  Create potential rules based on transaction information.
  Store rules.

In one embodiment, a Package Rules Adjustment Program, for example, stored in a memory element for a computer executing operations discussed supra, includes the following functionality:
  Retrieve offer performance data.
  Alter offer rules based on performance data.
  Store rules.

In one embodiment, the memory element is for storing processor operational or financial parameter 146 regarding the business entity and the processor is for modifying or further modifying offer 120 using the AIP and operational or financial parameter 146. In another embodiment, the processor is for modifying or further modifying offer 120 using the AIP and purchasing history 148, stored in the memory element, for the customer. In one embodiment, the processor compiles purchasing history 148 for the customer with respect to the business entity. Although specific parameters are noted above, it should be understood that other parameters are within the spirit and scope of the claimed invention.

In one embodiment, the memory element stores at least one rule 150. In general, rule 150 can be used in place of or in conjunction with the AIP in any or all of the operations described infra and supra regarding the processor or the AIP.

In one embodiment, the processor generates or modifies rule 150 using the AIP. Thus, the present invention is self-learning with respect to the rule and the rule can be automatically modified according to feed-back, modifications, or other benchmarks. It should be understood that a modified rule 150 can be used for any or all of the operations described supra or infra for rule 150. Commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007 is applicable to the operation of the AIP and rule 150.

In one embodiment, computer 152, separate from computer 108, transmits modifying rule 154 to computer 108. Computer 152 can be in location 118 (not shown) or can be in a different location. Computer 152 can be associated with a business entity associated with location 118 or can be associated with a different business entity. Connection 156 between computers 108 and 152 can be any type known in the art. In another embodiment (not shown), multiple computers 152 are included and respective computers among the multiple computers can be associated with the same or different business entities. Computer 108 stores modifying rule 154 in memory 104.

In one embodiment, rule 154 is used with or in place of rule 150, or is used in conjunction with the AIP. Commonly owned U.S. patent application Ser. No. 12/151,043, filed May 2, 2008 and entitled "Method and System For Centralized Generation of a Business Executable Using Genetic Algorithms and Rules Distributed Among Multiple Hardware Devices" is applicable to the respective operations of computer 108 with respect to rule 154.

In one embodiment, computer 108 receives at least one modifying rule 158 from a POSD, for example, WCD 112, and stores the rule in memory 104. In one embodiment, rule 158 is used with or in place of rule 150, or is used in conjunction with the AIP. Commonly owned U.S. patent application Ser. No. 12/151,043, filed May 2, 2008 and entitled "Method and System For Centralized Generation of a Business Executable Using Genetic Algorithms and Rules Distributed Among Multiple Hardware Devices" is applicable to the respective operations of computer 108 with respect to rule 158.

In one embodiment, a POSD used in for a transaction, for example, WCD 112, includes a processor and a memory element, for example, processor 160 and memory 162. The memory element for the WCD stores at least one rule, for example, rule 164 and the processor for the WCD executes the transaction according to the rule. Commonly-owned and co-pending U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008 is applicable to the operations described regarding WCD 112, processor 160, rule 164, and the execution of the transaction, for example, placing order and responding to offers.

In one embodiment, an incentive can be an offer related to an item or service. The item or service can be any good or service known in the art. The following commonly-owned U.S. patent applications are applicable to the use of the AIP and or the rules described supra to modify or further modify an offer or generate an incentive including an offer: U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007; commonly-owned U.S. patent application Ser. No. 12/151/043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008; commonly-owned U.S. patent application Ser. No. 12/151, 038, titled: "METHOD AND APPARATUS FOR GENERATING AND TRANSMITTING AN ORDER INITIATION OFFER TO A WIRELESS COMMUNICATIONS DEVICE," inventors Otto et al., filed May 2, 2008; commonly-owned U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008; commonly-owned U.S. patent application Ser. No. 12/217,863 entitled "SYSTEM AND METHOD FOR PROVIDING INCENTIVES TO AN END USER FOR REFERRING ANOTHER END USER", inventors Otto et al., filed Jul. 9, 2008; commonly-owned U.S. patent application Ser. No. 12/217,824 entitled "METHOD AND SYSTEM FOR GENERATING A REAL TIME OFFER OR A DEFERRED OFFER", inventors Otto et al., filed Jul. 9, 2008; commonly-owned U.S. patent application Ser. No. 12/217,810 entitled "METHOD AND APPARATUS FOR GENERATING AND TRANSMITTING AN IDEAL ORDER OFFER", inventors Otto et al., filed Jul. 9, 2008; commonly-owned U.S. patent application Ser. No. 12/217,826 entitled "SYSTEM AND METHOD FOR GENERATING AND TRANSMITTING LOCATION BASED PROMOTIONAL OFFER REMINDERS", inventors Otto et al., filed Jul. 9, 2008; commonly-owned U.S. patent application Ser. No. 12/217,861 entitled "SYSTEM AND METHOD FOR LOCATION BASED SUGGESTIVE SELLING", filed Jul. 9, 2008; and commonly-owned U.S. patent application Ser. No. 12/217,821 entitled "SYSTEM AND METHOD FOR SCANNING A COUPON TO INITIATE AN ORDER", filed Jul. 9, 2008, which applications are incorporated by reference herein.

Any measure or metric known in the art can be used as parameter 146, including, but not limited to optimizing or maximizing revenues, profits, item counts, average check, market basket contents, marketing offer acceptance, store visitation or other frequency measures, or improving or optimizing speed of service, inventory levels, turns, yield, waste, or enhancing or optimizing customer loyalty or use of kiosks or internet or other POS devices, or use of off peak or other coupons or acceptance of upsell or other marketing offers, or reduction or optimization of any customer or employee or any other person's gaming, fishing, or any other undesirable action or activities and/or failures to act when desired, or minimizing or optimizing any dilution or diversion of sales, profits, average check, or minimizing or optimizing use of discounts and other promotions so as to maximize or optimize any of the foregoing desired actions, outcomes or other desired benefits, or any combination of minimizing undesired results while maximizing or optimizing any one or more of any desired results.

In one embodiment, the processor is for generating or modifying format or temporal parameter 166 for presentation of an offer. For example, the parameter is with respect to a time of day, week, month, or year at which the offer is presented, or with respect to a frequency with which the presentation of an offer is presented. The presentation of an offer is transmitted according to parameter 166. In another embodiment, the processor uses the AIP to generate or modify parameter 166. For example, parameter 166 can be generated or modified according to parameter 146.

Commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007, is applicable to the operations involving the AIP or any rules, noted supra and infra.

The discussion in commonly-owned U.S. patent application Ser. No. 11/983,679, filed Nov. 9, 2006 and entitled "Method and System for Generating, Selecting, and Running Executables in a Business System Utilizing a Combination of User Defined Rules and Artificial Intelligence" is applicable to modification of offer 120 by the processor and the AIP or rules 150, 154, or 158.

As disclosed in commonly-owned U.S. patent application Ser. No. 12/217,810 entitled "METHOD AND APPARATUS FOR GENERATING AND TRANSMITTING AN IDEAL ORDER OFFER", inventors Otto et al., filed Jul. 9, 2008, which application is incorporated by reference herein, in one embodiment, the processor reviews the transaction history to identify an item or service not included in the history (and presumably never ordered by the customer) or ordered by the customer at less than a predetermined frequency. Then, the processor, using the AIP, modifies offer 120, for example, by including an upsell or incentive for an item or service not included in the information or ordered at less than a predetermined frequency. In another embodiment, this pairing is used to realize the optimization of revenue or profits for the business entity.

It should be understood that various storage and removal operations, not explicitly described above, involving memory 104 and as known in the art, are possible with respect to the operation of system 100. For example, outputs from and inputs to the general-purpose computer can be stored and retrieved from the memory elements and data generated by the processor can be stored in and retrieved from the memory.

It should be understood that system 100 can be operated by the same business entity operating or owning a business location using the system, or can be operated by a third party different than the business entity operating or owning the business location using the system. In one embodiment, a third party operates system 100 as disclosed by commonly-owned U.S. patent application Ser. No. 11/985,141: "UPSELL SYSTEM EMBEDDED IN A SYSTEM AND CONTROLLED BY A THIRD PARTY," inventors Otto et al., filed Nov. 14, 2007.

It should be understood that system 100 can be integral with a computer operating system for a business location, for example, location 118 or with a business entity operating the business location. It also should be understood that system 100 can be wholly or partly separate from the computer operating system for a retail location, for example, location 118, or with a business entity operating the business location.

It should be understood that although individual rule sets and a single artificial intelligence program are discussed, various of the individual rule sets can be combined into composite rules set (not shown). Further, the functions described for AIP 110 can be implemented by combinations of separate AIPs (not shown). Any combination of individual rule sets or artificial intelligence programs is included in the spirit and scope of the claimed invention.

In general, system 100, and in particular, the processor using the AI program, operates to use artificial intelligence, for example, a generic algorithm, to inform or make some or all of the decisions discussed in the description for FIG. 1. In one embodiment, system 100 performs the operations described herein to attain or maximize an objective of a business entity, for example, performance with respect to parameter 146. Factors usable to determine an objective can include, but are not limited to: customer acceptance rate, profit margin percentage, customer satisfaction information, service times, average check, inventory turnover, labor costs, sales data, gross margin percentage, sales per hour, cash over and short, inventory waste, historical customer buying habits, customer provided information, customer loyalty program data, weather data, store location data, store equipment package, POS system brand, hardware type and software version, employee data, sales mix data, market basket data, or trend data for at least one of these variables. Thus, the present invention, for example, system 100, specifically, computer 108 and processor 106, use artificial intelligence, for example, AIP 110, to automatically generate or modify operations, parameters, and outputs, for example, offer 120, with respect to a goal, for example, a metric such as parameter 146 and automatically adapts the generation or modification operations, parameters, and outputs, for example, offer 120, to feedback, that is, the present invention is self-learning and self-adapting with respect to generating or modifying operations, parameters, and outputs, for example, offer 120. Further, the present invention can automatically generate or modify the goal and be self-learning and self-adapting with respect to the goal.

The present invention also includes a method for providing an alternate or ancillary product choice in response to an order placed by a customer-controlled point of sale device. Although the method is described as a sequence for clarity, no order should be inferred from the sequence unless explicitly stated. A first step stores, in a memory element for at least one specially programmed computer, an artificial intelligence program (AIP); a second step receives, from a first wireless communications device (WCD) and using an interface element in the at least one specially programmed computer, a first order for a first item or service available from a first business entity, the first order part of a transaction between a user of the first WCD and the first business entity; a third step generates, using a processor in the at least one specially programmed computer and the AIP, an offer in response to the first item or service, wherein the offer includes at least one second item or service available from the first business entity and wherein the at least one second item or service: is a substitute for the first item or service; includes a plurality of said second items or services in a package offer; or is a compliment to the first item or service; a fourth step transmits, using the interface element, the offer to a wireless communications network for transmission to the first WCD; a fifth step receives, from the first WCD and using the interface element, a second order for a third item or service available from the first business entity, wherein the second order is part of the transaction; a sixth step modifies, using the processor and the AIP, the offer in response to the first item or service and the at least one third item or service, wherein modifying the offer includes adding a first incentive to the offer; modifying a second incentive included in the offer; adding at least one fourth item or service available from the first business entity; or deleting at least some of said at least one first, second or third item or service from the order or offer; and a seventh step transmits, using the interface element, the modified offer to the wireless communications network for transmission to the first WCD.

In one embodiment, a step stores at least one rule in a memory element for the first WCD and another step executes, using a processor in the first WCD, the modified offer according to the at least one rule. In one embodiment, a step receives, using the interface element, at least one rule from a second WCD, or from a general-purpose computer associated with a second business entity; another step stores the at least one rule in the memory element; and a further step modifies the offer using the processor and the at least one rule.

In one embodiment, a step receives, using the interface element, a refusal of the modified offer from the first WCD; another step further modifies the offer, using the processor and the AIP, in response to the refusal, wherein further modifying the offer includes adding a third incentive to the offer; modifying the first or second incentive; adding at least one fifth item or service available from the first business entity; deleting at least some of said at least one first or third item or service from the order; or deleting at least some of said at least one second or fourth item or service from the modified offer; and a further step transmits, using the interface element, the further modified offer to the wireless communications network for transmission to the first WCD. In one embodiment, a step stores at least one rule in a memory element for the first WCD; and another step executes, using a processor in the first WCD, the further modified offer according to the at least one rule. In one embodiment, a step receives, using the interface element, at least one rule from a second WCD, or from a general-purpose computer associated with a second business entity; another step stores the at least one rule in the memory element; and a further step further modifies the offer using the processor and the at least one rule.

Although the following non-limiting discussion is directed to a present invention system, it is understood that the discussion also is applicable to a present invention method. The present invention leverages existing or future marketing systems, marketing programs, loyalty programs, sponsor programs, coupon programs, discount systems, incentive programs, or other loyalty, marketing, or other similar systems, collectively, "marketing systems" by adding programming logic, self-learning, and self-adaptation to generate or modify an offer. The present invention can use any, all, or none of the following considerations as part of generating or modifying an offer, or performing the operations described supra, for example, by adding programming logic, self-learning, and self-adaptation as noted supra: any one or more data or variables available or accessible, including, for example, any customer, business or sponsor information, such as, membership in a loyalty or other marketing program, ordering preferences or history, current sales volumes or budgets or targets, current or planned local, regional or national marketing programs or objectives, device preferences, current speed of service, quality of service or other operating data, budgets, objectives or trends, etc.

In one embodiment, the present invention employs any, all, or none of the following considerations as part of generating or modifying an offer, or performing the operations described supra, for example, by adding programming logic, self-learning, and self-adaptation as noted supra:

1. Parameters or data regarding a customer, for example, a transaction history. For example, an offer can be made more attractive to the customer if the customer is a loyal customer or if the business entity wishes to entice the customer to purchase a good seldom ordered by the customer in the past. Proclivity to accept or reject offers of the same or other types. Customer objectives also can be considered.
2. The customer class or type. For example, an offer can be made more attractive to the customer if the customer is grouped with loyal customers or if the business entity wishes to entice the customer group to purchase a good seldom ordered by the customer group in the past. Customer group objectives also can be considered.
3. Temporal parameters, such as the time of day, week, month, or year. For example, the system can reduce prices in an offer to encourage sales during times of historic low sales volume or increase prices in an offer during times of historic high sales volume.
4. The good or service involved in a past, current, or possible future transaction between the customer and the business entity. For example, an offer for items with a short shelf life can be made more attractive to encourage a larger volume of orders for the items.
5. Inventory on hand. For example, an offer can be modified to encourage sale of overstocked items or to maximize profits for items in short supply.
6. Specifics of a transaction. With the use of the AIP, system 100 can automatically, dynamically, and intelligently adapt an offer to any parameter associated with a particular transaction. Further, the parameters to which the system is to adapt an offer can be automatically, dynamically, and intelligently selected or modified.
7. Physical parameters of the transaction process. For example: order entry device, e.g., kiosk, cell phone, PDA, laptop, IED, etc.; output display device (e.g., customer facing display, kiosk, cell phone, PDA, laptop, IED, etc.); or in a quick serve restaurant, an offer can be generated and presented to encourage use of self-service kiosks, which may optimize revenue for the business entity, or to discourage use of a point of sales station attended by an employee.
8. Rate of sale of items. For example, prices in an offer can be increased for goods that are selling rapidly or reduced for goods that are selling slowly.
9. Reservations. For example, to encourage customers to make reservations at a sit down restaurant, prices in an offer can be reduced for orders placed by customers making reservations.
10. Regular orders. For example, based on the transaction history, prices in an offer for a restaurant can be reduced for items regularly ordered by a customer or prices can be reduced on items rarely ordered by a customer to encourage the customer to order the rarely ordered items.
11. Employee. For example, to increase prices for an offer handled by an employee with a high success rate of handling such incentives.
12. The nature of the transaction, for example, determining feasible upsells to include in an offer.
13. The location at which the transaction is occurring, for example, lowering the price in an offer to encourage patronage at a location.
14. Business Information or objectives, for example, parameter 146.
15. Sponsor Information or objectives.
16. Marketing Program Type.
17. Opt In Information.
18. Payment method or terms or conditions of payment.
19. Marketing Message Contents.
20. Marketing Offer Objectives.
21. Expected or Actual System Results or tracking data.
22. System determined discounts or other incentives required to achieve desired results.
23. One or more table entries provided by one or more end users, for example, a system administrator.
24. One or more rules provided by one or more end users, for example, a system administrator.
25. One or more genetic algorithms or other AI based rules or determination methods.
26. Point within transaction, e.g., pre-order, mid-order, post order, etc.
27. Loyalty program information.
28. Current store activity, e.g., high or low volumes of transactions.
29. Customer survey information.
30. Financial considerations, such as total current price/profit, total expected price/profit, regular or discounted price, gross margins, profit margins, labor rates, labor availability, marketing funds available, or third party funds available, budget.
31. Expectation of accept or reject of one or more offers at one or more price points.
32. Current, prior or expected level of dilution, gaming, fishing, accretion.
33. Business, customer, or employee target goals.
34. Current or planned local, regional or national or other marketing campaigns, including, for example, product introductions, price or other promotions, print, radio or television or other advertisements, e.g., newspaper coupon drops, etc.
35. Business, customer, sponsor, or system objectives.
36. Business, customer, sponsor, third party, or system information.
37. Any other information, data, rules, system settings, or otherwise available to the marketing system or disclosed invention or other system designed to deliver one or more marketing messages, offers, or coupons, etc.
38. Any combination or priority ranking of any two or more of the foregoing.

In one embodiment, offers or other parameters, are created or maintained centrally or in a distributed network, including, for example, locally. Such management may be accomplished via any applicable means available, including, for example, making use of existing, e.g., off the shelf or customized tools that provide for such creating, management or distribution.

In another embodiment, in an effort to further enhance generating or modifying an offer, or a parameter or to otherwise improve one or more aspects of the present invention, the invention may access certain information from existing systems, including, for example, existing POS databases, such as customer transaction data, price lists, inventory information or other in or above store, for example, location data, including, but not limited to data in a POS, back office system, inventory system, revenue management system, loyalty or marketing program databases, labor management or scheduling systems, time clock data, production or other management systems, for example, kitchen production or manufacturing systems, advertising creation or tracking databases, including click through data, impressions information, results data, corporate or store or location financial information, including, for example, profit and loss information, inventory data, performance metrics, for example, speed of service data, customer survey information, digital signage information or data, or any other available information or data, or system settings data.

In one embodiment, each location associated with the present invention establishes its own rules, uses its own AIP or generic algorithm, or learns from local customer behavior or other available information. In another embodiment, the present invention shares some or all available information or results data among any two or more or all locations or locations that fall within a given area, region, geography, type, or other factors, such as customer demographics, etc., and makes use of such information to improve the present invention's ability to perform present invention operations described supra and infra.

For example, when using an AI based system, such as disclosed in commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007," one location may discover or otherwise determine that a certain type or class of offers are particularly effective. By sharing such information among other locations, for example, similar locations, the present invention can begin to make use of the same or similar offers in other generally similar locations or with similar customers or classifications of customers so as to improve the performance of one or more other such locations or all locations. In this fashion, the present invention can learn which desired agreements or incentives generally achieve the desired results or improve trends towards such results. Likewise, the present invention can more quickly determine which offers do not yield the desired results or determine how long such offers are required to achieve the desired results.

In one embodiment, offers are provided or subsidized by one or more third parties, including, for example, third party sponsors. For example, a vendor supplying an item in an offer could subsidize the offer to encourage acceptance of the item. In another example, such an offer may be partially or fully subsidized by an unrelated third party sponsor. For example, as part of an offer, a telecommunications company offers to view an advertisement for telecommunications company or fill out a survey or perform some other action or accept a subsequent or related optional or required offer, etc.

In one embodiment, customers are grouped by the processor according to similarities in transaction history or other customer information. The system generates, modifies, or uses an offer or parameter per the grouped customers.

In one embodiment, the operations of the processor and the AIP, described supra and infra, include the generation of executables as disclosed by commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

In one embodiment, the present invention generates, modifies, or uses an offer or parameter based upon other performance data or results, for example, a transaction history. In another embodiment, the present invention determines the impact of transaction histories, offers, or presentations on the ability or proclivity of an employee or customer to game or fish the present invention. The system avoids or ceases transaction histories, offers, or presentations and/or changes the type of transaction histories, offers, or presentations provided or suppressed.

In one embodiment, transaction histories, offers, or presentations vary from customer to customer or from time to time, or one or more of these may be consistent regardless of the customer, time, or other information. In another embodiment, where transaction histories, offers, or presentations vary, such transaction histories, offers, or presentations are determined via any applicable means and using any available information to make such determination, including, for example, any available customer, account, business, or sponsor information or any one or more customer, account, business, or sponsor objectives or any combination of the forgoing. In a further embodiment, transaction histories, agreements, incentives, or presentations are further determined or modified based upon information or needs or business objectives of one or more suppliers or competitors of such suppliers. For example, if a WCD is within a geographical area for a location selling competing items A and B, an offer is generated and transmitted for one or both of the items and vendors for the items underwrite the cost for the price to the business entity. In one embodiment, one or more of the above operations are performed using the AIP.

In one embodiment, a present invention system generates, modifies, or uses transaction histories, offers, or presentations based upon current or previous buying habits or any other available information regarding a customer. If for example, an end user is a loyal customer for item A, the present invention can increase the price in the offer for item A or decrease the price in the offer for a different item depending upon any known factors, for example, did the customer receive or act upon an offer for item B. If the customer did receive or act upon a reminder for item B, in another embodiment, the present invention reduces a cost in the offer for item A as a blandishment to purchase item A instead of item B, or matches or beats a price for item B, or queries such loyal (or other) customer to determine what price such customer would require to purchase item A. In this fashion a competitive environment is created. In one embodiment, one or more of the above operations are performed using the AIP.

In one embodiment, the end user of a present invention system modifies the rules or method of operation so as to favor itself. For example, in the previous example, if the producer of item A were the sole end user of the present invention, the producer may choose to not share any part or all of any such customer information or may use knowledge of any reminder regarding item B to its benefit. In another example, if a grocery chain was the sole end user of the present invention, the end user may choose to provide equal access to the present invention or favor one or more of its suppliers based upon any one or more of its business objectives, for example, the profitability or perceived or actual quality or consistency or pricing of such one or more suppliers. In one embodiment, one or more of the above operations are performed using the AIP.

In one embodiment, in order to receive an agreement or incentive, customers are required to opt in to a cellular marketing program or some other loyalty program indicating their desire or providing permission for such marketing system or the business entity to send one or more such agreement or incentive. In this fashion, only those interested in such communications will be sent such communications.

In a further embodiment, an offer is modified for prospective customers having an identity previously provided by an existing customer, as described in commonly-owned U.S. patent application Ser. No. 12/217,863, titled: "SYSTEM AND METHOD FOR PROVIDING INCENTIVES TO AN END USER FOR REFERRING ANOTHER END USER," inventors Otto et al., filed Jul. 9, 2008, which application is incorporated by reference herein. For example, if an existing quick service restaurant chain customer provides one or more prospective customer's identity, when such prospective customer is identified during a transaction with a quick service restaurant chain's participating location, the present invention generates or modifies an offer to encourage participation in the program and provides the identity of the referring party along with such offer. In one embodiment, one or more of the above operations are performed using the AIP.

In one embodiment, the present invention improves results over time or with use of the invention. Such improvement or optimization can be accomplished via any means necessary including any of several methods well known in the art or as disclosed by applicants and incorporated herein by reference, including, for example, commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007; commonly-owned U.S. patent application Ser. No. 12/151,043: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008; and commonly-owned U.S. patent application Ser. No. 12/151,038: "METHOD AND APPARATUS FOR GENERATING AND TRANSMITTING AN ORDER INITIATION OFFER TO A WIRELESS COMMUNICATIONS DEVICE," inventors Otto et al., filed May 2, 2008. For example, statistical methods can be used to determine which offers or presentations generally yield the desired or optimal or generally better results, or such results may be determined using artificial intelligence, for example, one or more genetic algorithms, or a present invention administrator/operator can review results reports and then provide manual weighting criteria to further define or control the present invention, or a combination of these and other well known methods may be employed in any combination or in any order or priority.

In one embodiment, a present invention offer includes a discount. Such discounts can be associated or applied to specific items, or to an entire order. In one embodiment, discounts are determined based upon rules established by management of the present invention or as established or modified from time to time by any authorized personnel, or may be initially established or modified using a learning system, e.g., a genetic algorithm. In any such case, the present invention can make use of any or all available information, including, but not limited to transaction history and customer information. Discounts can be designed to maximize, minimize or optimize any one or more business or customer objectives as desired or indicated. In another embodiment, the discount, if any, is presented to the customer as a percentage discount or as a cents or other amount off discount. In one embodiment, one or more of the above operations are performed using the AIP.

In one embodiment, discounts in offers are used/tried relatively sparingly to determine the price elasticity of customers, both as a whole and/or by class, group, demographics, type or order contents, base order amounts, and/or specific customer's buying habits and acceptance/rejection information. In this fashion, the present invention can, over time, yield optimal results by learning or otherwise determining what price reductions, if any, are required given the known information. For example, if a customer has not complied with an agreement, the present invention could include a price offering a 10% discount in an incentive if the customer complies with the agreement. If the customer rejects such offer, the present invention could offer a larger discount in the incentive, for example, for a 20% discount. Once the present invention determines an agreement holder's price points, and/or a holder becomes habituated to executing agreements, the present invention can reduce or eliminate related discounts or other incentives. In one embodiment, one or more of the above operations are performed using the AIP.

In one embodiment, the present invention, having acquired data regarding customer price elasticity, compliance, or other information, uses such information to determine other offers or presentations for the same or generally similar customers, e.g., other customers who fail to accept a type of offer. In another embodiment, using such logic, the present invention determines classifications of customers and leverage use of such information by providing offers that also are optimized from the location or location management perspective/objectives. In one embodiment, one or more of the above operations are performed using the AIP.

In one embodiment, an administrator can add or change or otherwise modify the previous listing, or data, or determine the order of priority or preference of each such discrimination factors or preferences or data, including, for example, location, payment or device, ranking each in order of such preference or providing table, rules or other entries to provide or assist or to support determining which are preferred or the amount of incentive available or increased or decreased incentive, as a percentage or absolute or relative or other dollar or other calculation method to determine what price modifications, if any to make, at which locations, devices or payment methods or other discriminating factors, for example, customer or business preferences or customer, business, sponsor or other entity information, objectives, rules or other available information or rules or system settings. By providing or otherwise manually or automatically determining such rankings, the disclosed invention can initially or continuously evaluate potential pricing and modify such pricing or provide other incentives to drive a desired percentage of business or customer transactions to one or more particular devices, locations or payment methods. In one embodiment, one or more of the above operations are performed using the AIP.

In one embodiment, the present invention provides such offers initially, or on an ongoing basis or only until certain objectives are achieved or certain customers or all customers are generally habituated to compliance to offers, after which, in certain embodiments, the present invention may cease, temporarily or permanently making such price incentives based upon such discriminating factors, or may reduce the difference in incentives, or may only periodically provide such full discounts or reduced discounts so as to reinforce such behavior. In another embodiment, a system administrator or other end user establishes such rules or conditions. In one embodiment, one or more of the above operations are performed using the AIP.

In one embodiment, the present invention makes such determinations using an automated means. Such automated means includes, for example, a system that periodically or generally continuously tests different transaction histories or offers or other methods, for example, user interfaces, or other benefits or incentives, and based upon such testing, determine which transaction histories, offers or other benefits yield the desired compliance, for example, with a business objective. Such automated system may periodically cease providing such incentives once it is determined that the desired customer behavior has been established, habituated or otherwise persists without need for such continued incentive. If such system subsequently determines that the desired behavior has ceased or fallen below a desired level, such system can then reinstate an appropriate incentive. When reinstating such incentive, the present invention can return to previously successful levels, or can provide different transaction levels on a temporary, periodic or permanent basis. Such reinstatement may be provided for all customers, certain customers, classes of customers, or only those customers that have ceased or have generally reduced their frequency of desired behavior. In one embodiment, one or more of the above operations are performed using the AIP.

In one embodiment, the present invention tests transaction histories or offers or provides certain pricing on a periodic basis within a single location or among a plurality of locations so as to determine the extent or requirement regarding any such transaction histories or offers or other benefits. For example, by testing incentive levels, the present invention can determine the level of incentive needed to attain a business goal, or such a system can further determine the extent of any gaming, dilution, diversion or accretion. By alternating offering and not offering incentive modification or by testing various levels of incentives, the present invention can better determine the optimal incentive, discount or benefits required, if any, to achieve the desired results, while minimizing or mitigating any undesirable effects of using or deploying such system. Such testing can be accomplished via any applicable or available means, including those previously disclosed by applicants herein and within the referenced applications, or randomly or using rules or AI based systems. By periodically testing or making changes to such transaction histories, account data, metrics, desired transactions, incentives, or presentations or benefits, the present invention can continually strive to achieve the optimal mix and level of transaction histories, account data, metrics, desired transactions, incentives, or presentations or benefits. By combining the use of one or more of a table, rules or AI based system, including, for example, as disclosed in the applications incorporated by reference herein, a more effective, responsive, adaptive, and dynamic marketing system may be developed and deployed that achieves optimal or nearly optimal results over both the short and long term.

In one embodiment, the present invention tests customers of one or more locations using, an incentive, for example, discounted pricing, while maintaining the regular prices at one or more other locations. By comparing the results data from such test and control groups of locations, the present invention can better determine which incentives are accretive or provide net benefit or are subject to gaming, fishing or other fraudulent or undesirable activities. Such testing can be performed within a single unit as well, by periodically offering such incentives to the same or similar customers or by randomly providing or not providing such incentives. In one embodiment, one or more of the above operations are performed using the AIP.

In one embodiment, the present invention makes use of a combination of such testing methodologies in order to best determine which offers yield optimal or the best results given the present invention information, parameters or any one or more customer, business, sponsor or present invention objectives. For example, the present invention tests in a single or group of stores certain new or untested offers, and combines such test with a periodic modification of offers, for example, toggling, between higher and lower price discounts, which toggling, may be random, 50/50, or may be intelligently determined, for example, using the AIP, based upon system information, and continue such test for a period of time, for example, one month, while comparing results of such tests with a similar number of stores in a control group, and then, switch the process, for example, test within the original control group and stop offering modified agreements, incentives, or presentations within the original test group. In this fashion the present invention determines the effects of offer modifications and the effect of such modifications on customers, customer buying habits, store or business results, or any other measures, including, for example, testing for dilution, diversion, accretion, gaming or fishing. In one embodiment, one or more of the above operations are performed using the AIP.

In one embodiment, a system administrator is able to enter or modify or delete or otherwise provide transaction histories or offers using an interface provided for such purposes. When establishing messages or content of transaction histories or offers such administrator or other end user may be further permitted to designate which transaction histories or offers are to be generally used when using a particular type of communications. For example, one type of transaction history or offer may be designated for use when communicating via cell phone and another transaction history or offer used for email and still other versions for each or all of the other various methods of communications. In another embodiment, the present invention tests each transaction history or offer with each such communications method to determine, partially or wholly, which transaction history or offer yields the best or optimal results over time or based upon any available information, including, for example, any available or otherwise accessible customer, business or sponsor information or objectives or by tracking actual activities and results or changes in behavior as expected or predicted by customers or other end users or classes or categories of uses or by device, location or payment method. In a further embodiment, one or more of the above operations are performed using the AIP.

The following is a listing of exemplary hardware and software that can be used in a present invention method or system. It should be understood that a present invention method or system is not limited to any or all of the hardware or software shown and that other hardware and software are included in the spirit and scope of the claimed invention.

1. Hardware:
   a. Central Controller or Local Controllers. The present invention can be managed by a central system on behalf of multiple business entities or locations or systems associated with portions of the multiple business entities or locations can implement the present invention.
   b. Retailer System 1-n
   c. End User Device 1-n
2. Software:
   a. Offer Creation Program: dynamically generates offers during course of a transaction; dynamically modifies offers during course of a transaction, for example, based on transaction histories; and generates and modifies presentations for offers. Uses artificial intelligence, for example, generic algorithms.
   b. Package Creation Program: selects substitute and complimentary items or services and creates actual packages of items or services. Uses artificial intelligence, for example, generic algorithms.

The following is a listing of exemplary data bases that can be used in a present invention method or system. It should be understood that a present invention method or system is not limited to any or all of the databases shown and that other databases are included in the spirit and scope of the claimed invention:

Retailer Database-stores retailers participating in the program

End User/Consumer Database-stores end user personal, billing, and transaction data Device Database-stores devices where offers can be made Inventory Database: stores the inventory of one or more business entities, for example, at retail locations.

Location Database: stores the location of business entities, end user devices, and candidate items or services.

Transaction Database: stores transaction information, for example, with respect to specific customer or groups of customers, specific business entities or locations, or specific items or services.

Package Offer Database: stores offers for packages.

Package Offer Rules Database: stores rules for making package offers.

Offered Packages Database: stores data regarding previously presented package offers including transaction information.

Substitute Offers Database: stores offers for substitutes.

Substitute Offer Rules Database: stores rules for making substitute offers.

Offered Substitute Database: stores data regarding previously presented substitute offers including transaction information.

Ancillary Offers Database: stores offers for ancillary or complimentary products.

Ancillary Offers Rules Database: stores rules for making ancillary or complimentary product offers.

Offered Ancillary Database: stores data regarding previously presented ancillary or complimentary offers including transaction information.

Manufacturers Database-stores manufacturer information including products and discount offers for products It is to be understood that the embodiments and variations shown and described herein are merely illustrative of the principles of this invention and that various modifications may be implemented by those skilled in the art without departing from the scope and the spirit of the invention. For example, while the invention has been illustrated as being implemented using particular computer systems including hardware components such as a computer, POS terminals, and input and output devices, the invention could also be implemented using other hardware components and/or other interconnections between such components. Also, while the invention has been described as being implemented using a computer, some or all of the functionality could alternatively reside in a POS terminal or other computing device. The invention could also be implemented using discrete hard-wired components instead of computers. Further, while the above description refers to particular databases, other databases or data structures could be used. In addition, while various embodiments of methods in accordance with the invention have been discussed which include specific steps listed in specific orders, a person of skill in the art will recognize that these steps can be performed in different combinations and orders. While other modifications will be evident to those skilled in the art, the present invention is intended to extend to those modifications that nevertheless fall within the scope of the appended claims.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A method for providing an alternate or ancillary product choice in response to an order placed by a customer-controlled point of sale device, comprising the steps of:
    storing, in a memory element for at least one specially programmed computer, an artificial intelligence program (AIP);
    receiving, from a first wireless communications device (WCD) and using an interface element in the at least one specially programmed computer, a first portion of an order for a first item or service available from a first business entity, the order part of a transaction between a user of the first WCD and the first business entity;
    determining, using a processor in the at least one specially programmed computer:
        a transaction history of the user,
        a location associated with all of the transaction, the user of the first WCD and the first business entity,
        a business target goal, and
        a point within the transaction;
    determining, using the processor and the AIP, a sequence of
        a plurality of offer types,
        wherein the sequence of the plurality of offer types comprises a prioritized list of the following offer types:
        a substitute offer type,
        a package offer type, and
        a complement offer type;
    generating, using a processor in the at least one specially programmed computer and the AIP, an offer in response to the first item or service and based on the transaction history of the user, the location, the business target goal, the determined sequence of offer types, and the point within the transaction, wherein the offer includes at least one second item or service available from the first business entity and wherein the at least one second item or service: is a substitute for the first item or service; includes a plurality of said second items or services in a package offer; or is a complement to the first item or service;

transmitting, using the interface element, the offer to a wireless communications network for transmission to the first WCD;
receiving, from the first WCD and using the interface element, a second portion of the order for a third item or service available from the first business entity;
modifying, using the processor and the AIP, the offer in response to the first item or service and the at least one third item or service and based on the transaction history of the user, the location, the business target goal, and the point within the transaction, wherein modifying the offer includes adding a first incentive to the offer; modifying a second incentive included in the offer; adding at least one fourth item or service available from the first business entity; or deleting at least some of said at least one first, second or third item or service from the order or offer; and, transmitting, using the interface element, the modified offer to the wireless communications network for transmission to the first WCD;
receiving, from the first WCD and using the interface element, an acceptance by the user of the modified offer;
altering, using the processor, the transaction based on the acceptance of the modified offer,
wherein the first WCD is an order taking device for the transaction in a retail establishment at the location.

2. The method of claim 1 further comprising the steps of:
storing at least one rule in a memory element for the first WCD; and,
executing, using a processor in the first WCD, the modified offer according to the at least one rule.

3. The method of claim 1 further comprising the steps of:
receiving, using the interface element, at least one rule from a second WCD, or from a general-purpose computer associated with a second business entity; and,
storing the at least one rule in the memory element, wherein modifying the offer includes using the processor and the at least one rule.

4. The method of claim 1 wherein modifying the offer comprises determining that a first offer type of the prioritized list is refused by the user and selecting the next offer type in the prioritized list.

5. A system for providing an alternate or ancillary product choice in response to an order placed by a customer-controlled point of sale device, comprising:
a memory element for at least one specially programmed computer, for storing an artificial intelligence program (AIP);
an interface element, for the at least one specially programmed computer, for receiving, from a first wireless communications device (WCD), a first portion of an order for a first item or service available from a first business entity, the order part of a transaction between a user of the first WCD and the first business entity;
a processor for the at least one specially programmed computer, for determining:
a transaction history of the user,
a location associated with all of the transaction, the user of the first WCD and the first business entity,
a business target goal, and
a point within the transaction; and
determining, using the AIP, a sequence of a plurality of offer types,
wherein the sequence of the plurality of offer types comprises a prioritized list of the following offer types:
a substitute offer type,
a package offer type, and
a complement offer type;
generating, using the AIP, an offer in response to the first item or service and based on the transaction history of the user, the location, the business target goal, the determined sequence of offer types, and the point within the transaction, wherein the offer includes at least one second item or service available from the first business entity and wherein the at least one second item or service: is a substitute for the first item or service; includes a plurality of said second items or services in a package offer; or is a complement to the first item or service;
wherein the interface element is for:
transmitting the offer to a wireless communications network for transmission to the first WCD; and,
receiving, from the first WCD, a second portion of the order for a third item or service available from the first business entity;
wherein the processor is for modifying, using the AIP, the offer in response to the first item or service and the at least one third item or service and based on the transaction history of the user, the location, the business target goal, and the point within the transaction, wherein modifying the offer includes adding a first incentive to the offer; modifying a second incentive included in the offer; adding at least one fourth item or service available from the first business entity; or deleting at least some of said at least one first, second or third item or service from the order or offer; and,
wherein the interface element is for transmitting the modified offer to the wireless communications network for transmission to the first WCD,
wherein the interface element further is for receiving from the first WCD an acceptance by the user of the modified offer,
wherein the processor further is for altering the transaction based on the acceptance of the modified offer,
wherein the first WCD is an order taking device for the transaction in a retail establishment.

6. The system of claim 5 wherein the first WCD includes a memory element arranged to store at least one rule and wherein the first WCD includes a processor for executing the modified offer according to the at least one rule.

7. The system of claim 5 wherein the interface element is for receiving at least one rule from a second WCD, or from a general-purpose computer associated with a second business entity, wherein the memory element is for storing the at least one rule, and wherein the processor is for modifying the offer using the at least one rule.

8. The system of claim 5, wherein modifying the offer comprises determining that a first offer type of the prioritized list is refused by the user and selecting the next offer type in the prioritized list.

9. A method for providing an alternate or ancillary product choice in response to an order placed by a customer-controlled point of sale device, comprising the steps of:
storing, in a memory element for at least one specially programmed computer, an artificial intelligence program (AIP);
receiving, from a first wireless communications device (WCD) and using an interface element in the at least one specially programmed computer, a first portion of an order for a first item or service available from a first business entity, the order part of a transaction between a user of the first WCD and the first business entity;

determining, using a processor in the at least one specially programmed computer, a transaction history of the user, a location associated with the transaction, a business target goal, and a point within the transaction;

determining, using the processor and the AIP, a sequence of a plurality of offer types,
  wherein the sequence of the plurality of offer types comprises a prioritized list of the following offer types:
  a substitute offer type,
  a package offer type, and
  a complement offer type;

generating, using the processor in the at least one specially programmed computer and the AIP, an offer in response to the first item or service and based on the transaction history of the user, the location associated with the transaction, the business target goal, the determined sequence of offer types, and the point within the transaction, wherein the offer includes at least one second item or service available from the first business entity and wherein the at least one second item or service: is a substitute for the first item or service; includes a plurality of said second items or services in a package offer; or is a complement to the first item or service;

transmitting, using the interface element, the offer to a wireless communications network for transmission to the first WCD;

receiving, from the first WCD and using the interface element, a second portion of the order for a third item or service available from the first business entity;

modifying, using the processor and the AIP, the offer in response to the first item or service and the at least one third item or service and based on the transaction history of the user, the location associated with the transaction, the business target goal, and the point within the transaction, wherein modifying the offer includes adding a first incentive to the offer; modifying a second incentive included in the offer; adding at least one fourth item or service available from the first business entity; or deleting at least some of said at least one first, second or third item or service from the order or offer; and, transmitting, using the interface element, the modified offer to the wireless communications network for transmission to the first WCD, wherein the first WCD is being used as an order taking device and the transaction is in a retail establishment.

10. The method of claim 9, wherein modifying the offer comprises determining that a first offer type of the prioritized list is refused by the user and selecting the next offer type in the prioritized list.

11. A system for providing an alternate or ancillary product choice in response to an order placed by a customer-controlled point of sale device, comprising:

a memory element for at least one specially programmed computer, for storing an artificial intelligence program (AIP);

an interface element, for the at least one specially programmed computer, for receiving, from a first wireless communications device (WCD), a first portion of an order for a first item or service available from a first business entity, the order part of a transaction between a user of the first WCD and the first business entity;

a processor for the at least one specially programmed computer, for determining a transaction history of the user, a location associated with the transaction, a business target goal, and a point within the transaction; determining, using the AIP, a sequence of a plurality of offer types,
  wherein the sequence of the plurality of offer types comprises a prioritized list of the following offer types:
  a substitute offer type,
  a package offer type, and
  a complement offer type;

and generating, using the AIP, an offer in response to the first item or service and based on the transaction history of the user, the location associated with the transaction, the business target goal, the determined sequence of offer types, and the point within the transaction, wherein the offer includes at least one second item or service available from the first business entity and wherein the at least one second item or service: is a substitute for the first item or service; includes a plurality of said second items or services in a package offer; or is a complement to the first item or service;

wherein the interface element is for:
  transmitting the offer to a wireless communications network for transmission to the first WCD; and,
  receiving, from the first WCD, a second portion of the order for a third item or service available from the first business entity;

wherein the processor is for modifying, using the AIP, the offer in response to the first item or service and the at least one third item or service and based on the transaction history of the user, the location associated with the transaction, the business target goal, and the point within the transaction, wherein modifying the offer includes adding a first incentive to the offer; modifying a second incentive included in the offer; adding at least one fourth item or service available from the first business entity; or deleting at least some of said at least one first, second or third item or service from the order or offer; and, wherein the interface element is for transmitting the modified offer to the wireless communications network for transmission to the first WCD, wherein the first WCD is being used as an order taking device and the transaction is in a retail establishment.

12. The system of claim 11, wherein modifying the offer comprises determining that a first offer type of the prioritized list is refused by the user and selecting the next offer type in the prioritized list.

* * * * *